United States Patent [19]

Schagen et al.

[11] 3,860,849

[45] Jan. 14, 1975

[54] CHANNEL PLATE WITH COLOR SELECTION ELECTRODES AND COLOR PHOSPHORS

[75] Inventors: Pieter Schagen; Hewson Nicholas Graham King; Derek Washington, all of Salfords, England

[73] Assignee: U.S. Philips Corporation, New York, N.Y.

[22] Filed: Sept. 13, 1972

[21] Appl. No.: 288,597

[30] Foreign Application Priority Data

Aug. 8, 1972 Great Britain .................... 42723/72

[52] U.S. Cl. ................. 313/400, 313/463, 313/473, H01j/31/20

[51] Int. Cl. ........................ H01j 29/08, H01j 29/32

[58] Field of Search.. 313/68 R, 68 A, 82 R, 82 BF, 313/85 R, 92 R, 92 PF, 92 CS, 82 NC, 86

[56] References Cited

UNITED STATES PATENTS

| | | | |
|---|---|---|---|
| 2,777,084 | 1/1957 | Lafferty | 313/86 X |
| 2,862,141 | 11/1958 | Kruper et al. | 313/85 R X |

*Primary Examiner*—Siegfried H. Grimm
*Attorney, Agent, or Firm*—Frank R. Trifari

[57] ABSTRACT

A channel plate with color selection electrodes and color phosphors for use as an image display screen in a color television tube.

2 Claims, 15 Drawing Figures

PRIOR ART

Fig. I

CHANNEL PLATE WITH COLOR SELECTION ELECTRODES AND COLOR PHOSPHORS

This invention relates to colour television display apparatus.

In conventional colour television display tubes, complex problems of registration arise. Thus, for example, the shadow-mask tube (in spite of the added cost and complexity of its three gun system) involves accurate alignment between the holes in the shadow-mask and the tri-colour phosphor triads on the display screen. In the case of the Chromatron there is the problem of aligning the colour-selector grid with the phosphor stripes. As for the Indexing or "Apple" tube, there is no problem of physical alignment since the colour phosphor strips and the indexing strips are formed on the same screen surface, but there is need for dynamic alignment (at dot frequency) between the instantaneous position of the beam and the external colour switching circuitry; also, it is not possible or practicable to use an elongated spot (which would be desirable) because it cannot be maintained parallel to the stripes at all parts of the screen.

It is an object of the invention to provide cathode-ray colour television display means which, while avoiding the complications of a three-gun system, permit also the avoidance of alignment problems such as those referred to above.

The invention provides a single-beam colour-television display tube comprising:

a. a channel plate as herein defined coextensive with the display area,
b. a plurality of phosphors each corresponding to one of the colours to be displayed, and
c. a plurality of colour-selection electrodes, the arrangement being such that
d. at least one of said phosphors and at least one of said colour-selection electrodes is provided on an additional perforate insulating layer on said channel plate,
e. any two phosphors and any two colour-selection electrodes that may be provided on such an insulating layer on the channel plate are spatially separated
f. whereas any phosphor and any colour-selection electrode that may be on a separate support near the output face of the channel plate is continuous or effectively continuous and has an area coextensive with the display area.

Such distribution of the phosphors and colour-selection electrodes avoids the need for registration or alignment between the channel plate and any separate screen that may be used. Such screen is not needed for the phosphors if all the phosphors are on the channel plate, and tri-colour examples of such an arrangement will be described. Conversely, if two phosphors are provided on such a separate screen, they are arranged for penetron-type selection as will be explained. Thus other tri-colour examples will illustrate (a) the use of a two-phosphor penetron screen in combination with a channel plate carrying a third phosphor, and (b) a single-phosphor screen in combination with a channel plate carrying two other phosphors.

When it is stated that any phosphor and any colour-selection electrode that may be on a separate support near the output face of the channel plate is continuous or effectively continuous, what is meant is that the phosphor or electrode need only be continuous in the functional sense and in the sense of not having any pattern that may require alignment with the channels of the channel plate. Thus, for example, an electrode may, if desired, have a mesh structure provided that its action is substantially the same at all channel outputs without any alignment therewith. On the other hand, as a further example, a phosphor providing a particular colour could be provided as separate grains provided that the grain size and density were such that several grains would always occur at each channel exit.

The colour selection may be effected either at the output of the channel plate (in which case relatively high selection potentials have to be applied) or at its inputs, and the aforesaid examples will also illustrate these alternatives. Selection electrodes can also be located inside the channel plate at intermediate depths as will be explained by reference to the input selection example.

The channel plate carries on or within itself all the parts that have to be mutually aligned and it can therefore be made as a self-contained unit which does not require alignment with any dot, stripe, grid or like structure on its output side.

The channel plate can also, by its very nature, provide substantially identical independent local sources of electrons at all parts of the display area, including the corner areas, and all the said sources are at the same orientation (e.g., orthogonal) to the display surface. A related advantage is that a much lower beam current can be used for the scanning beam and this in turn reduces the electron-optical problems which normally arise in the corner areas of the display.

A channel plate is a secondary-emissive electron-multiplier device comprising a matrix in the form of a plate having a large number of elongate channels passing through its thickness, said plate having a first conductive layer on its input face and a separate second conductive layer on its output face to act respectively as input and output electrodes.

Secondary-emissive intensifier devices of this character are described, for example, in British Pat. No. 1,064,073 and in U.S. Pat. Nos. 3,260,876, 3,387,137, 3,327,151, and 3,497,759, while methods of manufacture are described in British Pat. Nos. 1,064,072 and 1,064,075.

In the operation of the examples described in these specifications a potential difference is applied between the two electrode layers of the matrix so as to set up an electric field to accelerate the electrons, which field establishes a potential gradient created by current flowing through resistive surfaces formed inside the channels or (if such channel surfaces are absent) through the bulk material of the matrix. Secondary-emissive multiplication takes place in the channels.

In the main, present channel plate technology is based on the use of continuous dynodes formed as drawn lengths of fine tubing or hollow fibre, and the Patent Specifications referred to above describe principally channel plates of this type. However from the point of view of the size of normal colour television displays and the high cost of the drawn fibre method of manufacturing channel plates, it is preferable to use channel plates made up from continuous layers coextensive with the display area. In the simplest case such a plate may comprise a single layer or slab of insulating (and coated) or highly resistive material with an input electrode layer on one face and an output electrode layer on the other.

However, it may be preferable to use a modification of the conventional channel plate constituted by a laminated construction in accordance with earlier proposals by J. Burns and M. J. Neumann (Advances in Electronics and Electron Physics XII, 1960 pp 97–111). An example of such a configuration is given in FIG. 1 of the accompanying diagrammatic drawings which corresponds to FIG. 1 of the Burns et al paper. The plate comprises a succession of metal sheets M having corresponding arrays of conical apertures Ca. Each series of coaxial apertures Ca provides one of the multiplier channels, secondary emission being provided mainly by the areas Se of the plates M as shown (unlike present conventional channel plates, plates of this kind operate on the basis of a finite number of electron "jumps" determined by the number and geometry of the plates M).

One advantage of this type of channel plate is that the increasingly heavy standing currents needed towards the output ends of the channels are supplied through the metal plates and not through the bulk matrix material or channel surfaces of a conventional channel plate. This is all the more important in an application such as television display where a very large screen area has to be supplied with beam current and where high beam current intensities are needed to operate the phosphor at high brightness levels.

The plates M are separated from each other by layers of insulation D and, of course, progressively higher accelerating potentials have to be applied to successive plates M. In the arrangement shown, Burns et al suggest the following relative dimensions:

TABLE I

| | | |
|---|---|---|
| d1 | = | 100 |
| d2 | = | 25 |
| d3 | = | 50 |
| $\gamma$ | = | 75° |

Among the methods of manufacture considered by Burns et al were such techniques as evaporation of an insulator, electrophoretic deposition of an insulator, and coating the screens with a powdered insulator such as $Al_2O_3$ suspended in a silicate solution. However as Burns explained the one which gave the best results was the use of glass enamel. A powdered glass of special composition is sifted onto the metal support, which is in this case the back or output side of the screen; then the temperature is raised to the fusion point of the glass, causing it to form a smooth, adherent glaze. When this is done with care and the glass powder is fine enough, obstruction of the screen mesh holes and any tendency of the glass to creep around onto the slant side of the holes can be avoided. The glass must bond well to the metal screen; fortunately, with Cu, Ni, or Cu-Ni alloy screens this requirement is not hard to meet. The glass is fused in air and the oxide film formed on the metal makes a good bond with many glasses. Some care must be exercised in the chice of glass formula: it should match the expansion coefficient of the metal reasonably well, else the screen will warp as it cools, making accurate registration impossible.

The secondary emission surface used on these screens was a thin film magnesium oxide emitter: this was prepared by evaporating a thin layer (500 to 1,000 A) of magnesium on to the slant sides of the screen holes and then baking the screen in an oxidizing atmosphere ($O_2$ or $CO_2$) until the magnesium was oxidized.

Embodiments of the invention will now be described by way of example with reference to FIGS. 2 to 15 of the accompanying diagrammatic drawings which illustrate a number of tri-colour tube constructions employing channel plates of the laminated type. In the drawings:-

Figure 1:
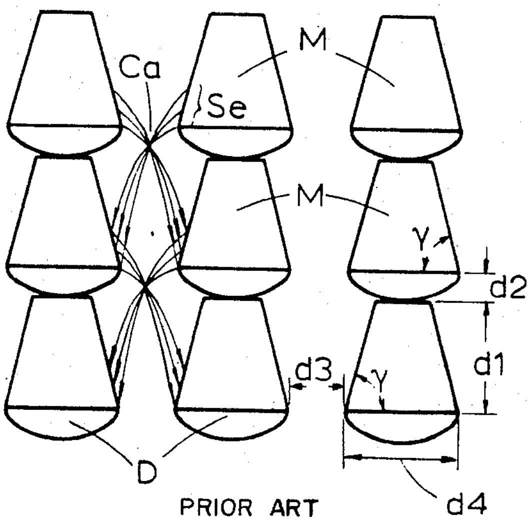
FIG. 1 shows a prior art channel plate.
Figure 2:
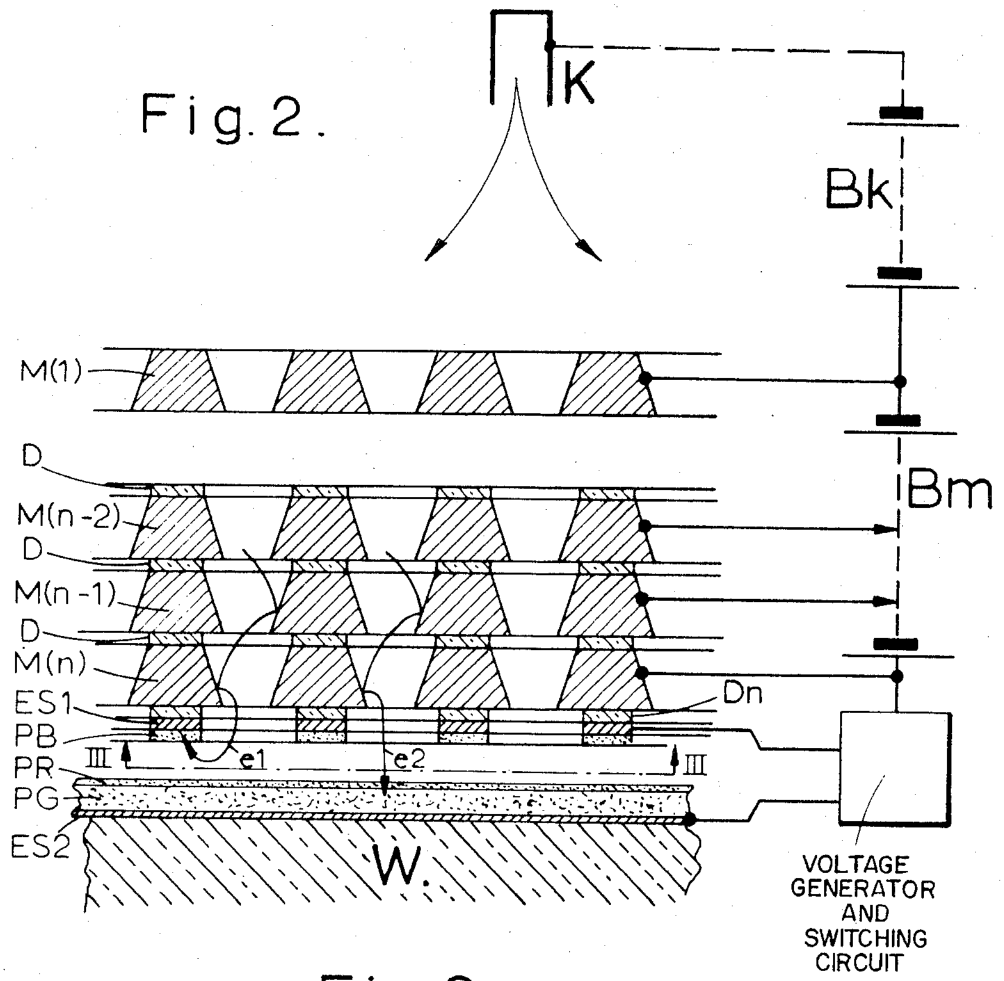
FIGS. 2 and 3 show a construction in which one phosphor is on the output side of the channel plate and the other two are on a separate support and form a penetron screen.
Figure 3:
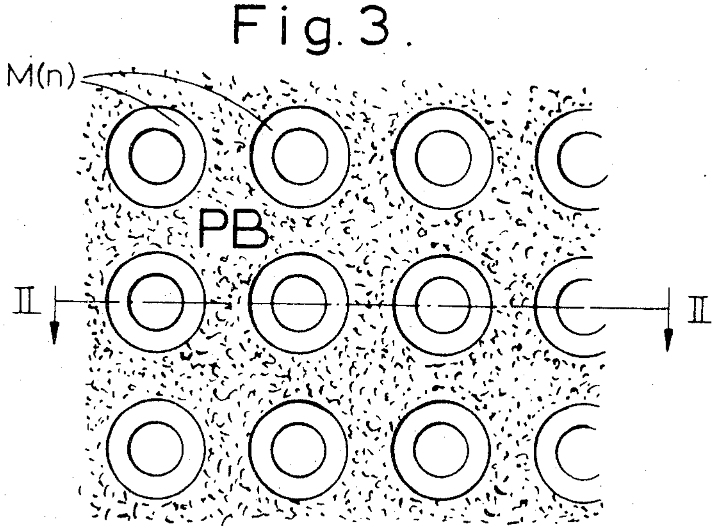

Referring first to FIGS. 2 and 3, FIG. 2 is an axial section while FIG. 3 is an elevation taken from the line III—III of FIG. 2. The last three stages of a channel plate of an improved FIG. 1 type is shown having (at its output side) metal plates M(n-2), M(n-1) and M(n) separated from each other by insulating layers D. Since the plate M(n) is the last one of the series, it constitutes the output electrode of the channel plate. Similarly, there is a first plate M(1) which constitutes the input electrode. All these plates are fed by a D.C. supply source shown schematically hematically at Bm.

Over the whole of an additional insulating layer Dn there is provided a colour selection or colour switching electrode Es1, and over the whole of said electrode is laid a phosphor corresponding to one of the three primary colours, for example the blue phosphor (PB).

The other two phosphors are provided all over a separate screen support W which may be a separate glass plate or the face-plate of the cathode-ray tube. These two phosphors, which may be the red (PR) an green (PG) ones as shown, are laid and operated in accordance with the "Penetron" principle described in U.S. Pat. No. 2,730,653 and British Pat. No. 1,272,005. The term "penetron screen" is used herein to denote a screen which emits light of different colours depending on the energy (and hence depth of penetration) of incident electrons. Such a screen may have a multilayer structure as shown in FIG. 2 or multi-layer grains as will be explained.

Between the green phosphor and the support W there is a transparent colour-selection electrode ES2 (for example tin oxide). By appropriate changes in the potentials applied to layers ES1 and ES2 it is possible to turn the electrons back (e1) to activate the blue phosphor or (e2) to strike the red or pass through the red phosphor with minimum activation so as to generate green light in the layer PG (of course, layer PG must be transparent to light from layers PR and PB and layer PR must be transparent to blue light from PB). One possible set of colour selection potentials is given below by way of illustration, such potentials being measured with reference to Plate M(n):

TABLE II

| | ES1 | ES2 |
|---|---|---|
| for Blue | +500 to +1000V | −500V |
| for Red | OV | +500V |
| for Green | OV | +3000V |

The generator and switching means for providing such potentials in a cyclic manner are shown schematically as a unit GSW. In most practical cases the amplitudes of the potentials and the capacitances of the electrode structure will preclude operation of unit SW at dot frequency and it will be necessary or desirable to reduce the colour switching frequency to the line frequency of the television system.

If line-frequency switching is adopted at the line frequency of the television standard (e.g., PAL or NTSC) there is the problem of "colour creep" or line crawl, but this can be overcome by using a system as described in Patent Specification (co-pending application 61516/69; PHB 32021). Such a system employs means for scanning and displaying (as a principal scan) one line of the raster at a time line-sequentially in accordance with the instantaneous incoming colour video signals, and means for scanning and displaying simultaneously (as a secondary scan) two preceding lines of the raster in the same colour in accordance with two corresponding stored video signals, the arrangement being such that the first stored signal is an undecoded composite tricolour video signal delayed by one line period through a first delay device and displayed on the first preceding line while the second stored signal is an undecoded composite tricolour video signal delayed by two line periods through a second delay device and displayed on the second preceding line.

Except for a schematic indication of a cathode K connected via an HT source Bk, the single beam gun of the cathode ray tube is omitted from the drawing for the sake of simplicity and also because it is not directly relevant to the invention, and the same is true of the beam deflection means which cause the beam to scan the input element M(1) of the channel plate in a line-by-line raster. Broadly speaking, the beam may be supplied from a gun arranged in a conventional manner with its axis normal to the centre of the display screen, or the gun may, for example, be arranged below or to one side of the screen in known manner to reduce the depth of the display system, the beam being turned through an average angle of, say, 90° while also being subjected to raster-scan deflections. As a further alternative, the beam may be subjected to two orthogonal deflections of about 90° in a "flat" tube arrangement of the Aiken type as described in British Pat. No. 801,841 and related Patent Specifications.

Since all the three phosphors and both of the colour selection conductors are continuous or effectively continuous, it is clear that there are none of the registration problems referred to in the preamable. If the red phosphor layer (PR) is actually continuous as shown in FIG. 2, it may be applied to the exposed face of the green (PG) layer by ion implantation. However, it may alternatively be laid on a transparent barrier layer provided on layer PG to stop low-energy electrons and thus improve colour purity.

As a further alternative, one of the phosphors on support W (e.g., the green phosphor) may be provided in known manner as closely packed grains which are coated with the other (e.g., red) phosphor.

The distance between layers PB and PR in the arrangement of FIG. 2 may for example, be 0.4 mm while the other dimensions are in the ratios given in Table I, with "100" representing about 200 $\mu$ and 0.5 mm pitch for the channels in the case of a large display. The picture element size can be equal to one channel or the channel pitch.

Figures 4, 5, 6:
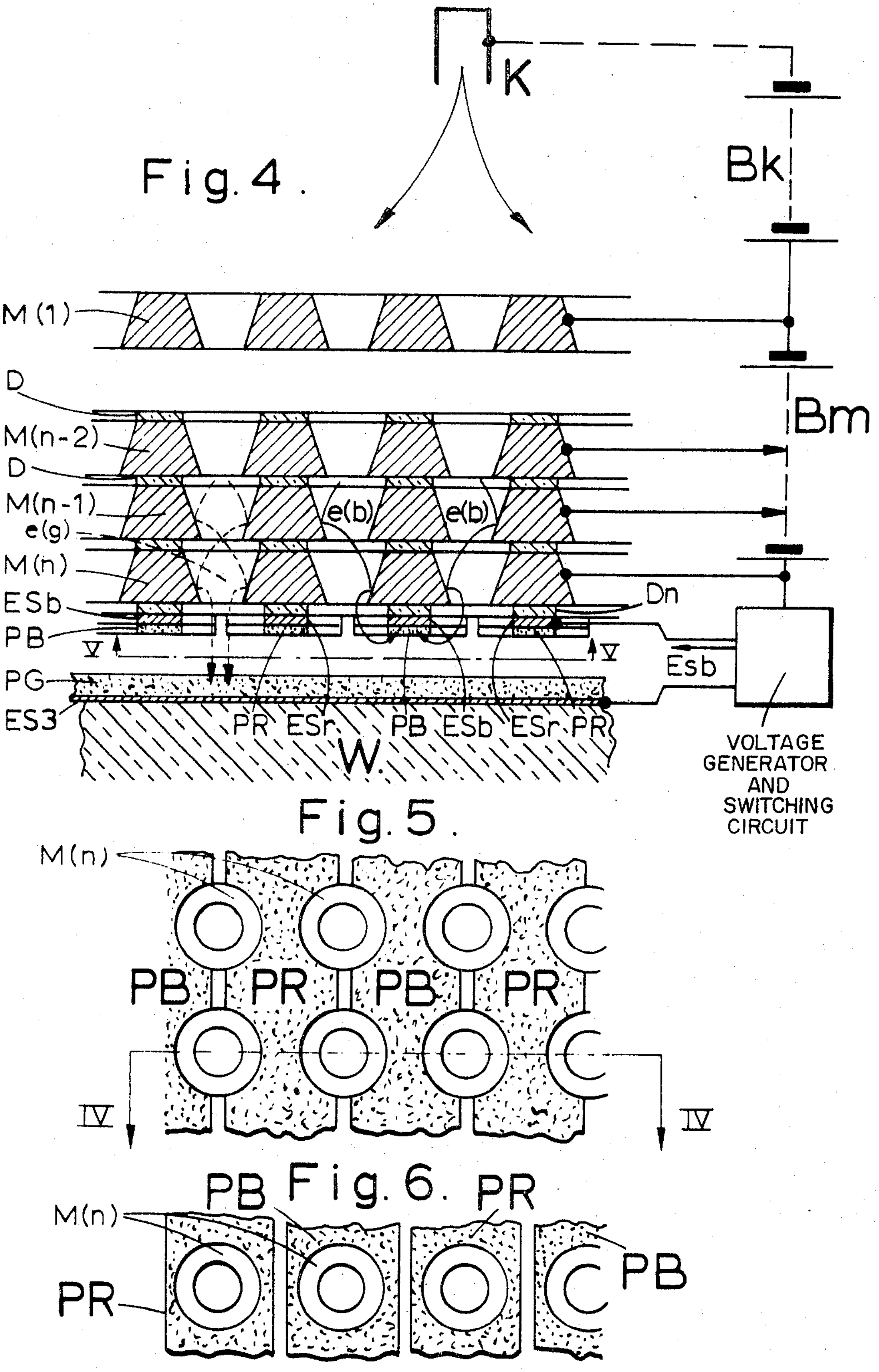
FIGS. 4 to 6 show constructions in which two phosphors are on the output side of the channel plate while the third is on a separate support.

Referring now to FIG. 4, corresponding elements have the same reference numerals as FIG. 1. The same general considerations apply to the positioning of the single-beam gun and the scanning means (not shown) and the nature of the support W, and the various dimensions of the structure may be the same except that the channel pitch relates to the picture element size in a different way.

In this case two of the three phosphors (e.g., red and blue in the example shown) are applied to the channel plate and they are shown (in FIG. 5) subdivided into interdigitated parallel strips having the same pitch as the channels. The first and second colour selection electrodes are spatially separated from each other by being formed as corresponding sets of parallel strips ESr (for red) and ESb (for blue). The third phosphor (e.g., green) is, as before, a continuous layer on the support W backed by a transparent colour selection layer (ES3 in this case).

All the ESr strips are commoned and so are all the ESb strips so as to form two interdigitated colour-selection electrodes. Depending on the potentials applied to the said strips and to the electrode ES3, three colour selection conditions are obtained. For red all the ESr strips are given a potential positive with regard to M(n) while all the ESb strips are made negative with regard to M(n) and layer ES3 is given a negative potential with regard to M(n) so as to repel or reflect the electrons emerging from the channels. In this condition each blue phosphor stripe will be struck by electrons from two adjacent rows of channels (this is illustrated by trajectories e(b). For red the situation is similar, the ESr and ESb potentials being exchanged while layer ES3 remains the same.

For green the ESr and ESb potentials are equalized and reduced while the ES3 potential is made positive with regard to M(n) so that the electrons strike layer PG (see trajectories e(g)).

By way of illustration, the potentials used may be as follows:-

TABLE III

| | ESr | ESb | ES3 |
|---|---|---|---|
| for Red | +500 to 1000V | OV or negative | −500 V |
| for Blue | OV or negative | +500 to +1000V | −500 V |
| for Green | OV | OV | +3000 V |

The fact that each red or blue phosphor strip is activated by channels from either side means that the picture element width (dp) is at least twice the channel pitch whereas in the arrangement of FIG. 2 it could be as small as the channel pitch. Thus in the case of FIG. 2 each channel can represent one picture element whereas the arrangement of FIG. 4 requires at least four channels (assuming an orthogonal channel array with channels equidistant in both directions as shown in the front elevation of FIG. 5). This width dp may, for the sake of illustration, be 0.5 mm with the other dimensions in the same proportions as given for FIG. 2.

As shown in FIG. 6, an alternative arrangement can be used for the red and blue phosphor strips, the colour selection conductors ESr and ESb still being coextensive with the phosphor stripes as in FIG. 5 (which corresponds to FIG. 4). In the FIG. 6 arrangement the electron trajectories differ from those of FIG. 4 in that each red phosphor stripe is activated by electrons from its own channels.

The beam may be scanned parallel to the red and blue stripes, in which case the colour switching may, again, be carried out line-sequentially and the system of patent Specification (co-pending application No. 61516/69; PHB 32021) may again be used to prevent line crawl or colour creep. Such scanning arrangements introduce an alignment problem as between the lines of the raster and the red and blue stripes.

The problem can be avoided by scanning at right angles to the red and blue stripes; this can be done line sequentially so as to avoid the synchronism problems present in the normal use of an Apple tube. By this method each red line scan produces a series of red dots which are separated by the blue stripes which at that stage are charged so as to repel electrons. Conversely each blue line scan produces a series of blue dots separated by the (inactive) red stripes. In this case a small delay may be used to offset the one-stripe shift between blue and red images.

Figure 7:
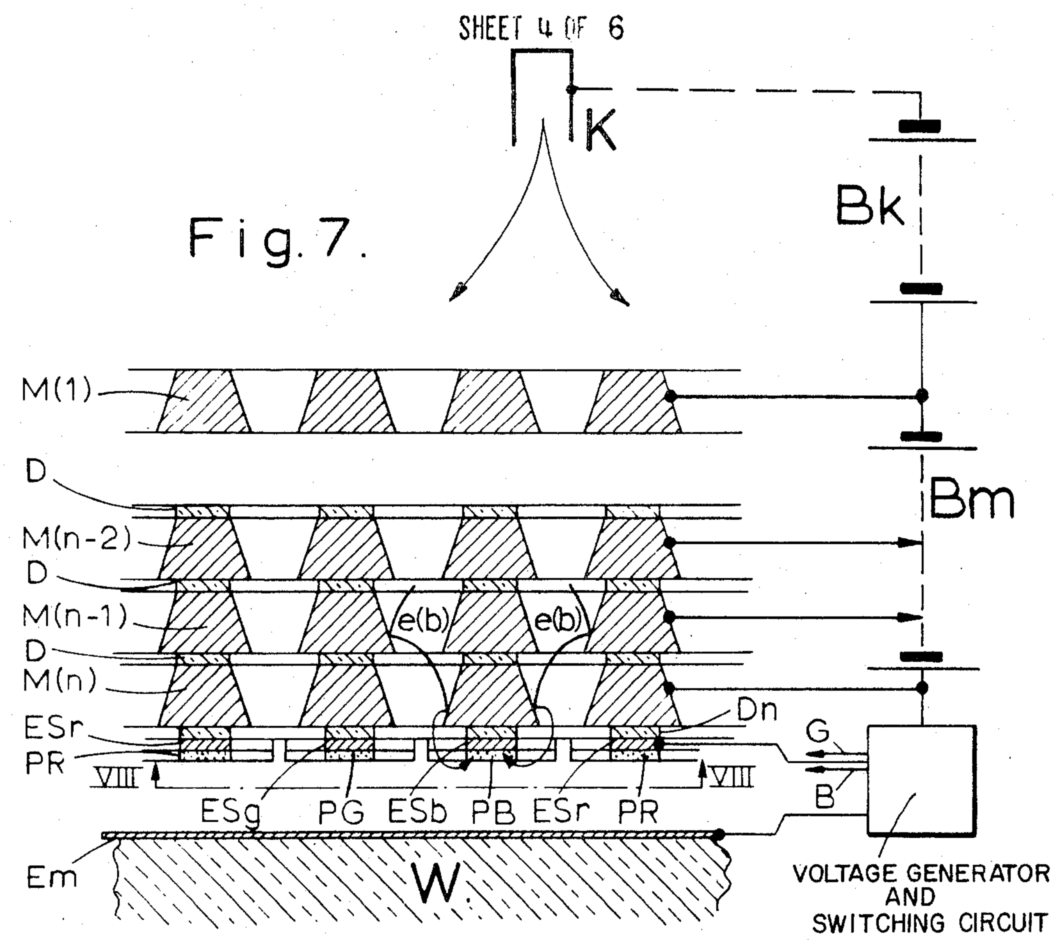
FIGS. 7 to 9 show constructions in which all three phosphors are on the output side of the channel plate.

A third embodiment is shown in FIG. 7 where all three phosphors are applied as parallel stripes to the output face of the channel plate.

Referring now to FIG. 7, corresponding elements have the same reference numerals as FIGS. 1 and 4. The same general considerations apply again to the positioning of the single-beam gun and the scanning means (not shown) and the nature of the support W, and the various dimensions of the structure may be the same.

In this case all of the three phosphors are applied to the channel plate and they are shown (in FIG. 8) formed as interdigitated parallel strips PR-PG-PB having the same pitch as the channels. The colour selection electrodes (which are laid on an additional insulating layer Dn) are formed correspondingly as three sets of commoned parallel strips ESr (for red), ESg (for green) and ESb (for blue). The separate support W carries only a transparent electrode Em (FIG. 7) which in this case doe not act as a selection electrode.

In this case the smallest complete picture element corresponds to $3 \times 3 = 9$ channels.

For red all the ESr strips are given a potential positive with regard to M(n) while all the ESb and ESg strips are made negative with regard to M(n). In all three selection conditions layer Em is given a negative potential with regard to M(n) so as to repel or reflect the electrons emerging from the channels.

The potentials used may be as given for red and blue in Table III.

Figure 8:
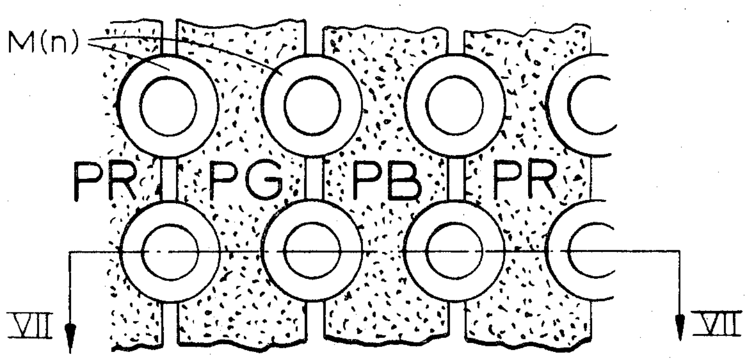
Figure 9:
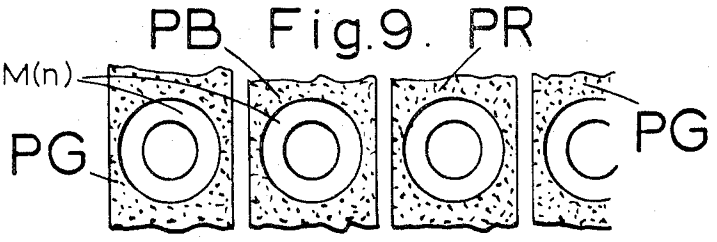

As shown in FIG. 9, the same alternative arrangement can be used for the phosphor strips as in FIG. 6, the colour selection conductors ESr, ESg and ESb still being coextensive with the phosphor stripes as in FIG. 8 (which corresponds to FIG. 7). In the FIG. 9 arrangement the electron trajectories differ from those of FIG. 7 in that each phosphor stripe is activated by electrons from its own channels.

As in the case of FIGS. 4 – 6, the beam may be scanned parallel to the phosphor stripes or at right angles thereto.

Figures 10, 11:
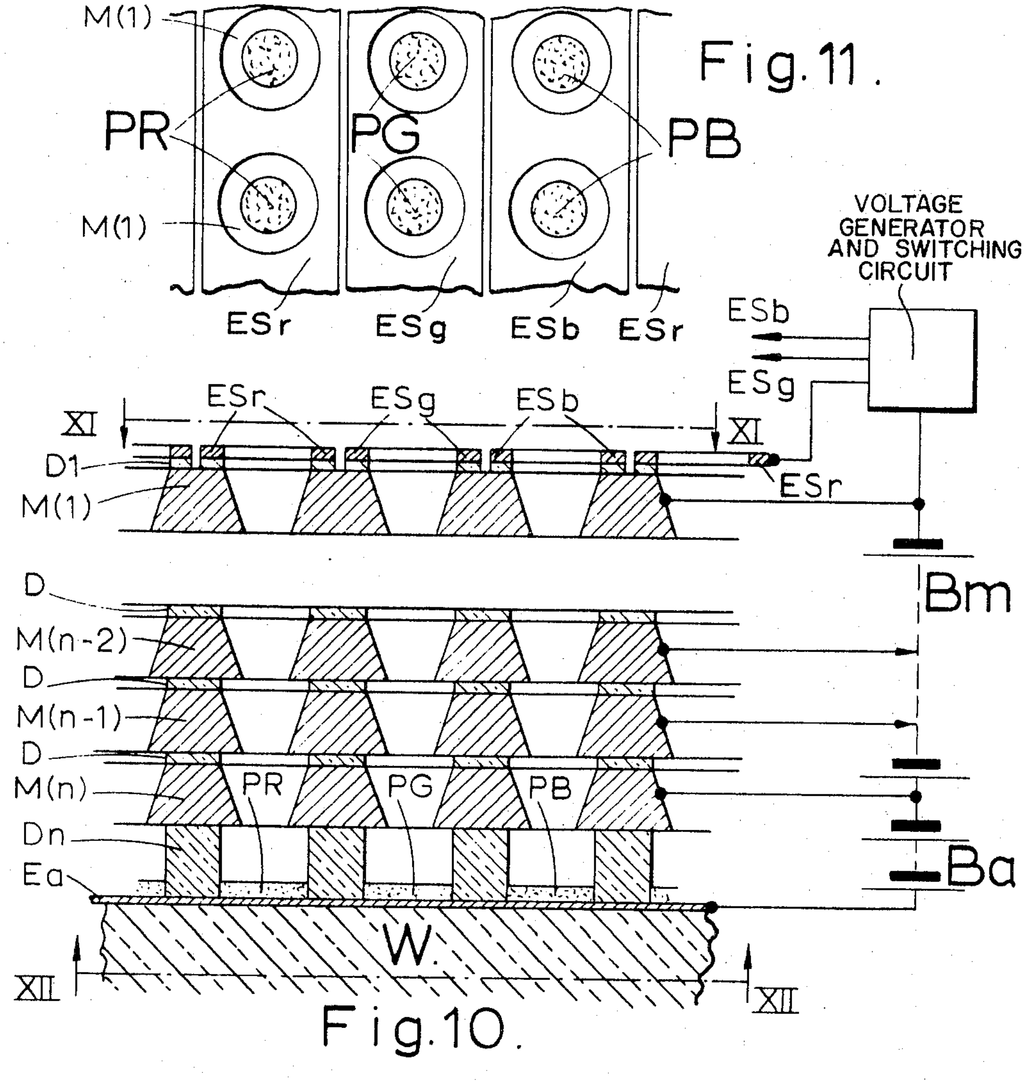
FIGS. 10 to 12 show a construction in which the three phosphors are again on the output side of the channel plate but are provided as enclosed dot elements while the colour selection electrodes are transferred to the input side of the channel plate.
Figure 12:
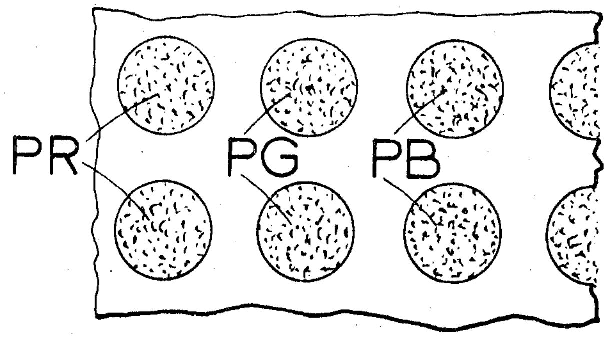

Referring now to FIGS. 10–12, corresponding elements have the same reference numerals as preceding Figures. The same general considerations apply again to the positioning of the single-beam gun and the scanning means (not shown) and the nature of the support W, and many dimensions of the structure may the same.

In this case all of the three phosphors are applied to the channel plate but they are contained as rows of dot elements in the exit apertures of the channels instead of being interdigitated parallel strips on the face of the plate. The colour selection electrode structure is correspondingly formed as three sets of commoned parallel strips ESr (for red), ESg (for green) and ESb (for blue) and said strips thus form three interdigitated electrodes which are provided on the input face of the channel plate instead of the output face. Therefore much smaller switching voltages can be used, for example about 200V.

Depending on the potentials applied to the electrode strips by unit GSW, three colour selection conditions are obtained. For red all the ESr strips are given a potential equal or positive with respect to plate M(1) while all the ESb and ESg strips are made negative with respect to M(1). Corresponding potentials are used for the other two colours.

Again, scanning may be carried out parallel to or at right angles to the red, green and blue rows of phosphor elements.

As shown in FIG. 10, the colour phosphors PR, PB, PG are located in extensions of the channels which are provided by a thicker additional insulating layer Dn. The apertures in layer Dn are larger than the exit apertures of plate M(n) so that the latter plate provides a degree of overhang. The phosphor elements only occupy the ends of the channel extensions in the layer Dn and are in contact with a transparent conductive non-switching layer Ea which in this case acts as an accelerating electrode to increase the electron velocity and the brightness of the display. An accelerating potential for layer Ea is provided by a source Ba.

The front elevation of FIG. 12 is taken as a view through transparent electrode Ea while FIG. 11 is a rear elevation. As shown in FIG. 10, the additional glass layer D1 is shown removed at the gaps between the selection electrodes so as to avoid static charge problems.

Figure 13:
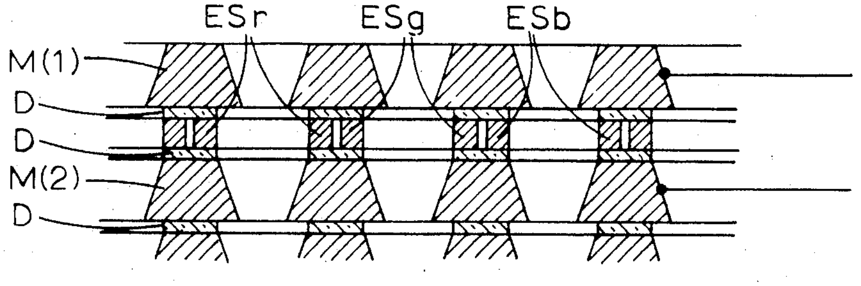
FIG. 13 illustrates a modification of the construction of FIGS. 10–12.

As an alternative to their external (rear) location, the selection electrodes of FIGS. 10–11 may be moved one stage inwards (as shown in FIG. 13) or at any intermediate stage between plate M(1) and plate M(n) of the matrix of the channel plate. In any of these cases the colour selection electrodes are preferably thicker than they need to be when located externally at the input or the output (this is shown in FIG. 13).

Figures 14, 15:
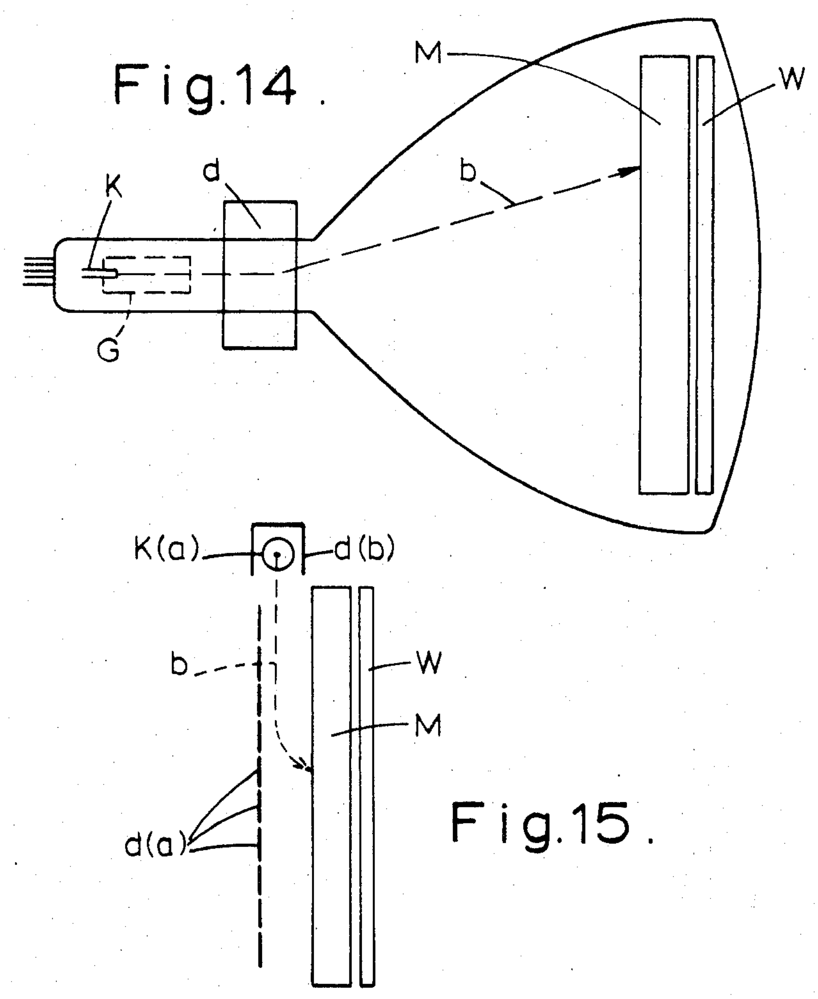
FIGS. 14 and 15 show schematically colour tubes according to the invention employing conventional and "flat" Aiken-type layouts respectively.

FIG. 14 shows schematically a flat channel plate and support assembly M-W according to the invention mounted inside a conventional cathode-ray tube having a gun G with cathode K and deflection means *d* for the beam *b*.

FIG. 15 shows a side view of a similar assembly M-W in an Aiken-type arrangement comprising a gun with a cathode K(a) providing a beam normal to the plane of the drawing. As explained in the aforesaid British Pat. No. 801,841 a horizontal series of deflection electrodes d(b) provide the horizontal scan and a series of horizontal deflection strips d(a) provide the vertical scan of the beam *b*.

Although FIGS. 5 and 8 show "square" arrays of channels, it may be desirable in some cases to increase the channel spacing in the transverse direction to allow for larger phosphor areas.

A continuous dynode channel plate can be used in place of the sandwich structure shown in the drawings, but the latter are advantageous in that larger currents can be supplied with consequent higher brightness levels.

Of course, in special applications where only two colours are required, the tubes described and their drive circuits can be correspondingly simplified in obvious manner.

What is claimed is:

1. An image display screen for use in a color television tube, comprising;

a channel plate defining a display area and having an input side for receiving electrons from a scanning electron beam and an output side for delivering electrons from channels in said channel plate;

a first color selection electrode insulated from and covering at least a portion of the output side of said channel plate but shaped so as to not block the channels of said channel plate;

a first phosphor layer corresponding to a first color substantially covering the side of said first color selecting electrode remote from said channel plate;

a second color selection electrode coextensive with said channel plate and spaced from and facing said first color phosphor; and a second phosphor layer corresponding to a second color substantially covering the side of said second color selection electrode on the side thereof facing said first color phosphor layer, whereby electrons delivered from said channel plate may be directed to either said first or second phosphor layers by application of appropriate electrical potentials to said first and second color selection electrodes.

2. The image display screen as defined in claim 1 and further comprising a third phosphor layer corresponding to a third color covering and coextensive with said second color phosphor layer, whereby through appropriate application of electrical potentials to said first and second selection electrodes electrons delivered from said channel plate may be directed to said first phosphor layer, or directed to said third phosphor layer for absorption therein or directed through said third phosphor layer for absorption in said second phosphor layer.

* * * * *

UNITED STATES PATENT AND TRADEMARK OFFICE

CERTIFICATE OF CORRECTION

PATENT NO. : 3,860,849

DATED : January 14, 1975

INVENTOR(S) : PIETER SCHAGEN ET AL

It is certified that error appears in the above-identified patent and that said Letters Patent are hereby corrected as shown below:

On the Title page, section [30], "42723/72" should be

--42723/71--

Column 4, line 48, "an" should be --and--

Signed and Sealed this

Seventh Day of June 1977

[SEAL]

Attest:

RUTH C. MASON
*Attesting Officer*

C. MARSHALL DANN
*Commissioner of Patents and Trademarks*